June 18, 1929.  C. B. HARRIS  1,718,144
AUTOMOBILE ELEVATOR
Filed Aug. 8, 1927
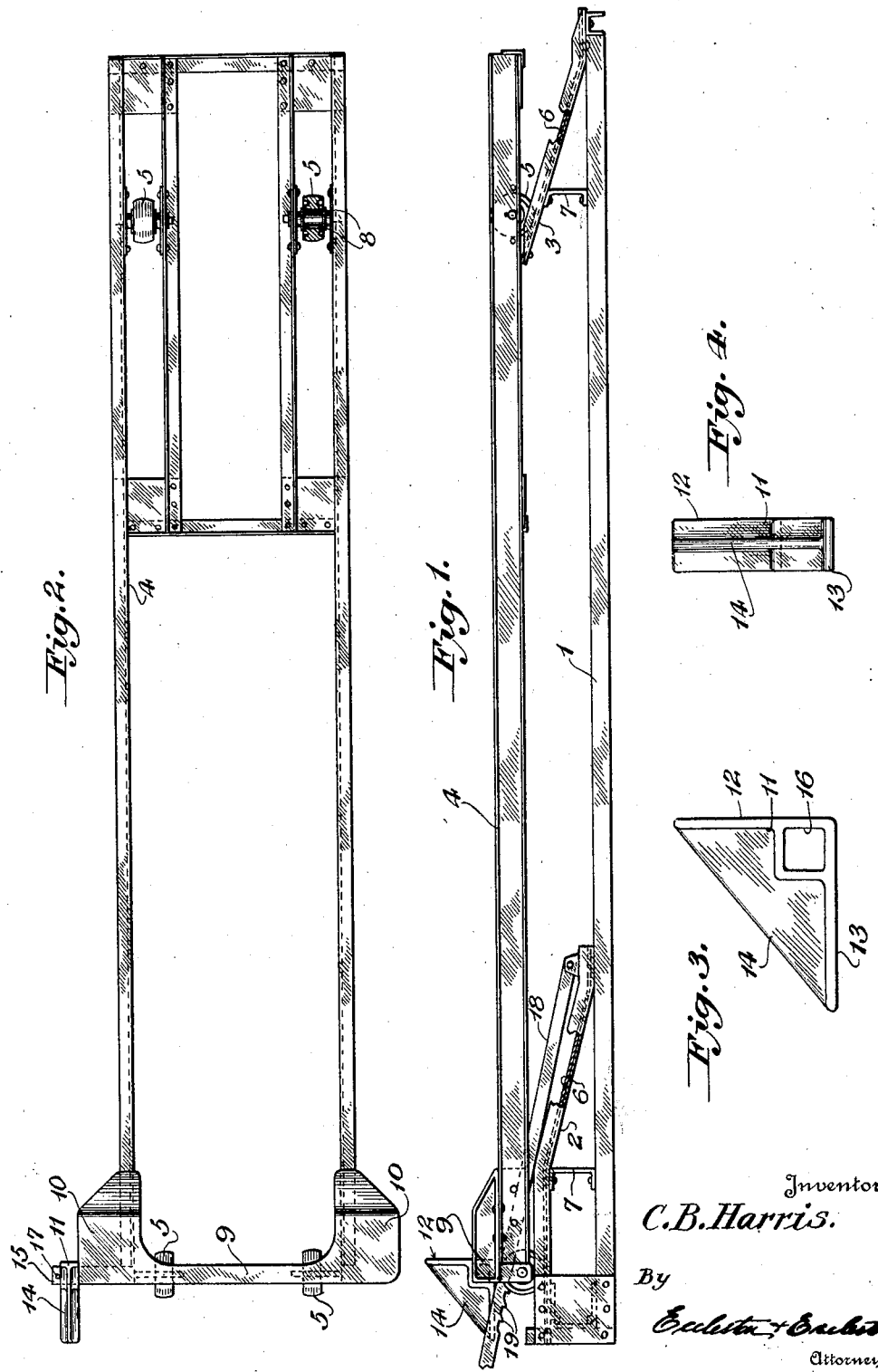
Inventor
C. B. Harris.
By
Eccleston + Eccleston,
Attorneys Patented June 18, 1929.

1,718,144

UNITED STATES PATENT OFFICE.

CLARENCE B. HARRIS, OF LOS ANGELES, CALIFORNIA.

AUTOMOBILE ELEVATOR.

Application filed August 8, 1927. Serial No. 211,583.

This invention relates to automobile elevators or lifts of the automatic type, that is, devices in which the power or momentum of the automobile itself causes the same to be lifted above the floor or ground to a position in which its running gear and other parts are readily accessible for oiling, repair and the like.

Such devices generally take the form of inclined runways with which a wheeled carriage cooperates, the automobile passing partly over the carriage and then engaging an abutment on the forward end of the carriage so as to cause both the carriage and automobile to be lifted as the wheels of the carriage ride up the inclined runways. In such structures it is necessary that the automobile back away from the lift because of the presence of the abutment which prevents a complete forward movement of the automobile over the lift. Many garages are so constructed as to necessitate that the automobiles continue in the same direction on leaving the garages and under such conditions it is obvious that lifts of the type described are impracticable.

An object of the present invention resides in the construction of a lift of the type described in which the abutment to be engaged by the front axle is removable from the carriage or else movable to a position in which it will not be engaged by an automobile passing over the lift.

Another object of the invention consists in the provision of a removable bearing head for the forward end of the carriage provided with flat plates or wings adapted to form bearing surfaces for springs of automobiles of the underslung type.

A further object of the invention is to generally improve the construction of this type of automobile lift so as to render the same more practicable and durable in operation.

Other objects and advantages of the invention will be apparent from the following description when taken in connection with the accompanying drawing; in which Figure 1 is a side elevation of the automobile lift with my improvements incorporated therein.
Figure 2 is a plan view of the carriage; and Figures 3 and 4 are side and end views respectively of the removable abutment.

Referring to the drawing in greater detail the numeral 1 designates the base or frame of the new auto lift and may be constructed of channel iron and provided with a sufficient bracing element to provide a strong and durable construction.

Secured to the opposite ends of the base member are inclined runways 2 and 3 adapted to serve as tracks for the carriage 4 on which the automobile is adapted to rest as it is lifted from the ground. Each of these runways is formed of two channel irons, one for each wheel 5 of the carriage, and the bases of the channel irons are preferably lined with wear clips 6 which serve to extend the life of the apparatus by reinforcing and protecting the runways. The channel members or inclines 2 and 3 may be supported by transversely extending channel bars 7 which are rigidly secured to the base member 1.

The carriage 4 is also preferably formed of channel bars riveted together and suitably braced, and the wheels 5 of the carriage are provided with roller bearings 8 to reduce friction and generally improve the operation of the apparatus.

Bolted to the top of the forward end of the carriage 4 is a cast steel head or bearing plate 9 provided with wings 10. This element 9—10 serves as a support or bearing for the front axle of the automobile being lifted, and it should also be noted that, due to the dimensions of the wings 10, this bearing element is well adapted to receive and support the springs of automobiles of the underslung type. By this arrangement, therefore, the lift is adapted for use with practically all types of present day automobiles.

As hereinbefore stated it is of paramount importance that lifts of the present type be so designed as to permit an automobile after being repaired to be run forwardly off of the lift so as to avoid confusion by backing the automobile about the garage. To this end I have provided the carriage 4 with a removable abutment 11 which is provided with the angularly disposed faces 12 and 13 and reinforcing web 14. The forward end of the carriage is provided with an extension 15 of angular cross section adapted to non-rotatably support the abutment 11, the latter being provided with an opening 16 to receive the extension 15 for this purpose. The abutment member may be locked to the extension 15 by means of a pin or the like 17, and it will be obvious that when the pin is withdrawn the abutment may be readily removed from the extension 15 and turned to inoperative position and replaced on the extension. It will thus be apparent that after an automobile has driven onto the lift and been raised due to its contact with the abutment in the position shown in Figures 1 and 2, it may again move forward after it is lowered to the floor after the abutment 11 is removed or replaced in inoperative position; i. e., with its working face in horizontal position.

In the present embodiment of the invention I have shown a conventional type of pivoted latch 18 provided with ratchet teeth 19 and adapted to cooperate with a fixed element on the carriage to releasably lock the latter in elevated position.

From the foregoing description taken in connection with the accompanying drawings it will be observed that I have devised an automobile lift of simple and inexpensive design, which is strong and durable in operation, readily and simply operated, and in which provision is made for the vehicle to continue on in the same general direction after it has been repaired and returned to the floor of the garage, thus avoiding any liability of confusion and congestion within the garage or other location of the lift.

In accordance with the patent statutes I have described what I now believe to be the best embodiment of the invention, but it is to be understood that various modifications may be made in the details of construction without departing from the spirit of the invention, and it is my intention to include all such changes within the scope of the appended claim.

What I claim as new and desire to secure by Letters Patent is:

An automobile lift including a base member, inclined runways on said base member, a wheeled carriage mounted on the runways, a horizontally disposed projection of angular cross-section secured to said carriage, and an abutment having an opening of angular shape mounted on said projection, whereby the abutment may readily be adjusted to inoperative position.

CLARENCE B. HARRIS.